United States Patent [19]

Müller

[11] Patent Number: 4,529,918
[45] Date of Patent: Jul. 16, 1985

[54] COLLECTORLESS DIRECT CURRENT OUTER ROTOR MOTOR

[75] Inventor: Rolf Müller, St. Georgen, Fed. Rep. of Germany

[73] Assignee: Papst-Motoren GmbH & Co. KG, St. Georgen, Fed. Rep. of Germany

[21] Appl. No.: 577,184

[22] Filed: Feb. 6, 1984

Related U.S. Application Data

[63] Continuation of Ser. No. 284,385, Jul. 17, 1981, Pat. No. 4,430,603.

[30] Foreign Application Priority Data

Jul. 18, 1980 [CH] Switzerland ............... 5498/80

[51] Int. Cl.³ .............................. H02K 29/02
[52] U.S. Cl. ......................... 318/254; 318/138; 318/439
[58] Field of Search ............ 318/138, 254 A, 254, 318/439

[56] References Cited

U.S. PATENT DOCUMENTS 4,430,603 2/1984 Muller ............... 318/138 X

FOREIGN PATENT DOCUMENTS 56-35671 4/1981 Japan ............... 318/254
57-40390 3/1982 Japan ............... 318/254
57-71259 5/1982 Japan ............... 318/254

Primary Examiner—Vit W. Miska
Assistant Examiner—Bentsu Ro
Attorney, Agent, or Firm—Fitch, Even, Tabin & Flannery

[57] ABSTRACT

A collectorless direct current outer rotor motor with a substantially cylindrical air gap (14), particularly for driving magnetic plate accumulators. The rotor (16) of the motor (10) supports a permanently-magnetized exciter magnet (13, 13″) having at least two pairs of poles and a permanently-magnetized control magnet (18, 18′, 18″). At least one detector (20, 34, 26) of rotary position cooperates with the control magnet, and is responsive to the magnetic field to sense the position of the rotor. There is also provided commutating means (32) responsive to the detector of the rotary position, and a stator winding means (12) connected to the commutating means. A control pulse generator stage (21,29; 35,36; 47,55) adapted to generate one pulse only per each revolution of the rotor (16) is coordinated with the control magnet (18, 18′, 18″).

3 Claims, 30 Drawing Figures

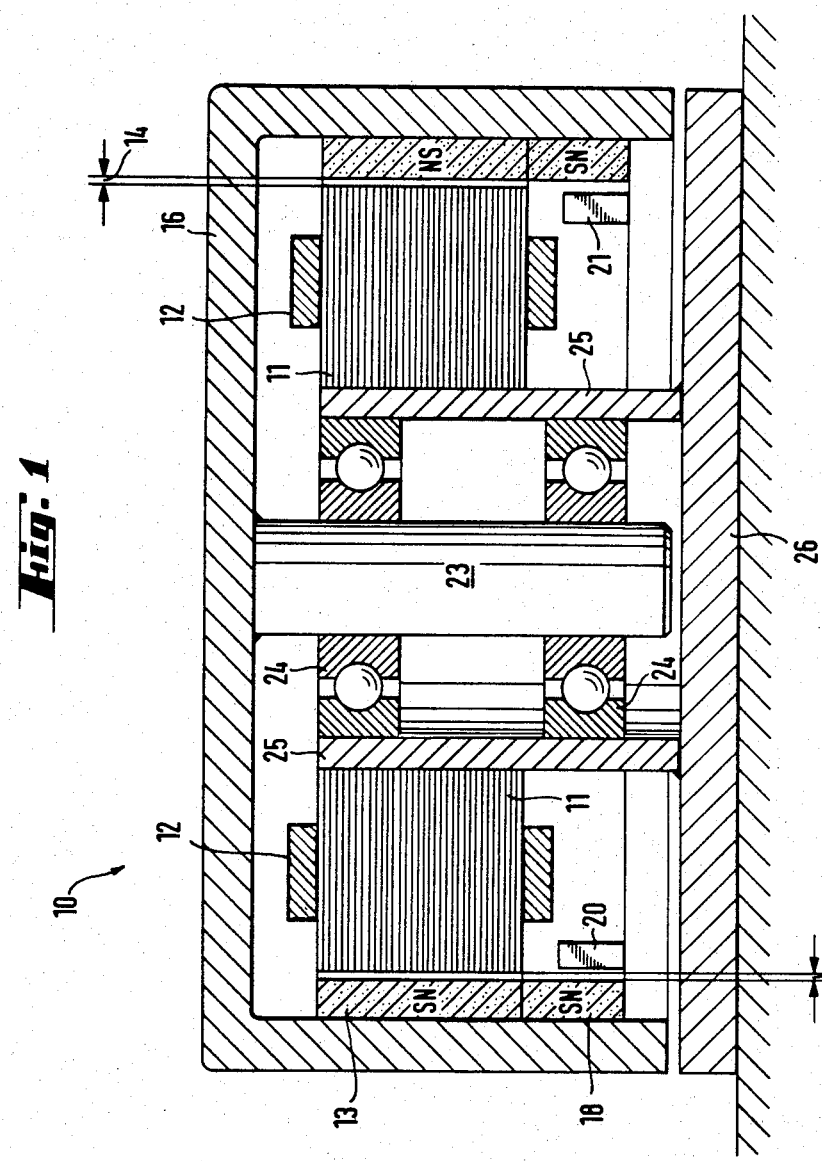

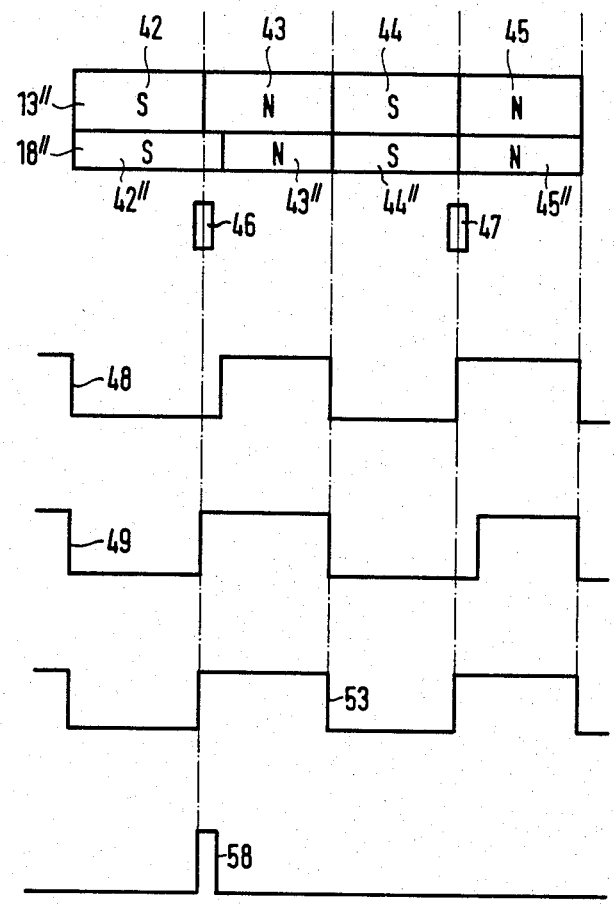
Fig. 5a
Fig. 5b
Fig. 5c
Fig. 5d
Fig. 5e
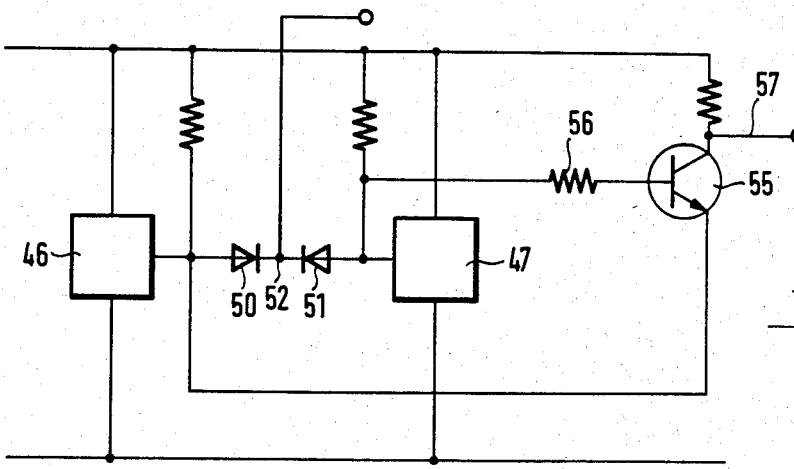
Fig. 6

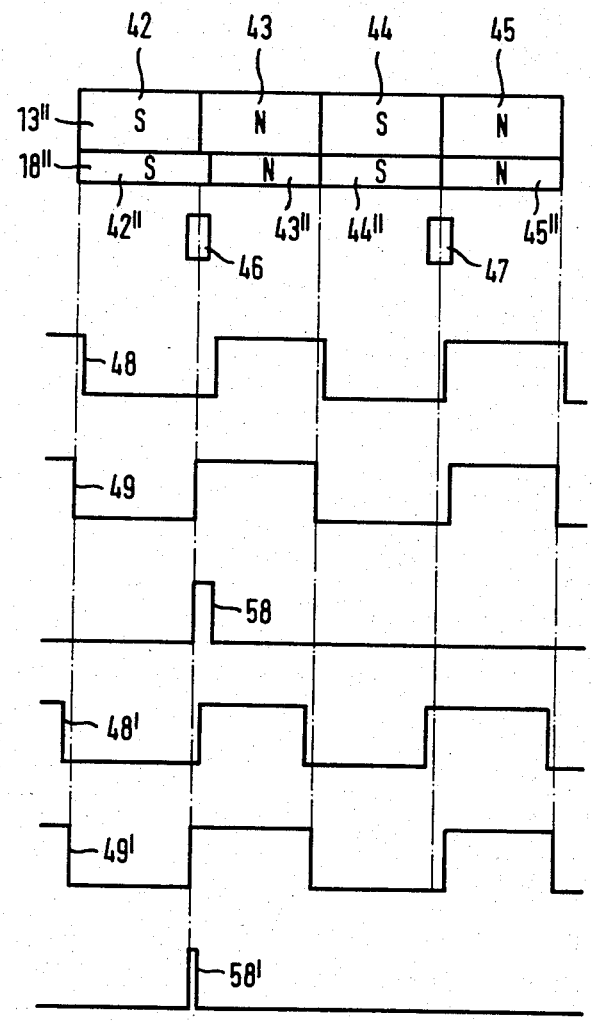

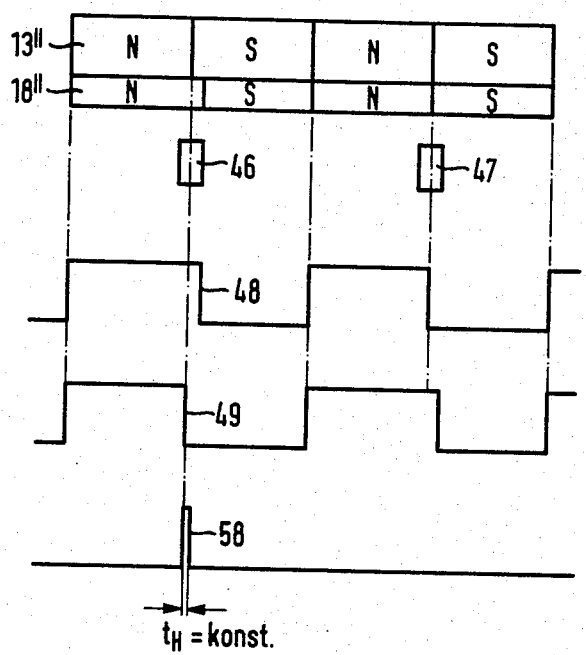

COLLECTORLESS DIRECT CURRENT OUTER ROTOR MOTOR

This is a continuation, of application Ser. No. 284,385, filed July 17, 1981, now U.S. Pat. No. 4,430,603. The invention relates to a collectorless direct current outer rotor motor with a substantially cylindrical air gap, particularly for driving magnetic plate accumulators, comprising a rotor having a permanently magnetized exciter magnet supporting at least two pairs of poles and a permanently magnetized control magnet, at least one detector of rotary position cooperating with the control magnet and being responsive to the magnetic field to detect the rotary position, a commutating means controlled in response to the detector of the rotary position, and a stator winding device connected to the commutating means.

Motors of such kind have been already known (U.S. Pat. No. 4,030,005, and U.S. Pat. No. 4,099,104). In connection with the use of these motors in practice, particularly for driving magnetic plate accumulators, but also in other cases, as for example in position driving systems of any kind, the question often arises in regard to the control signal which appears once only per each revolution of the rotor and which can be used as a reference signal for the angular position of the rotor, e.g. in the case of magnetic plate accumulators as the start marking for the beginning of the track.

Such a control system is spontaneously operative in motors with two-pole exciter magnets. For example, only the rising flank of the exciter curve is to be involved. But this simple system of generating the control signal is not obtained in motors where the exciter magnet has two or more poles, because two or more rising flanks appear in the field curve per each full revolution of the motor and the result is the absence of coordination between such a flank and the position of the rotor.

This disadvantage is overcome by the invention by associating with the control magnet a control pulse generating stage which generates only one pulse per revolution of the rotor.

In a further development of the invention the control magnet can be so radially unsymmetrically magnetized in the circumferential direction that it has only one pole in said direction of magnetization. The pole width of the said one control magnet pole coincides with the pole width of the exciter magnet. Diametrically opposite to the detector of the rotary position is another detector of rotary position, and a circuit stage adding up the output signals of both detectors of rotary position is connected in series with the commutating means. In this embodiment of the invention, the control signal unambiguously indicating the position of the rotor can be selectively emitted by the one or the other detector of the rotary position, for example in the form of the rising edge in the field curve of the control magnet via an edge-controlled monoflop. But the commutation signal is obtained by the addition of the output signals of the detectors of the rotary position.

According to a modified variation of the invention, the exciter magnet and the control magnet have each the same number of pairs of poles, with the same pole width. There is a discontinuity in the field course of the control magnet. In addition to the detector of the rotary position, there is provided another detector of rotary position responsive only to the field of discontinuity. The one detector of rotary position provides the commutation signal, while the other detector of rotary position provides the control signal which occurs only once per each revolution of the rotor.

A small auxiliary magnet can be simply associated in this embodiment with the control magnet in order to provide the field discontinuity, said auxiliary magnet being located at a predetermined place in circumferential direction. In order to evaluate the field curve, said one detector of rotary position is preferably a sensor responsive to the magnetic field and having a symmetrical Schmitt-trigger, and the other detector of rotary position is a sensor responsive to the magnetic field and having an unsymmetrical Schmitt-trigger, i.e. one responsive only to the signals of the one polarity. The symmetrical Schmitt-trigger provides the commutation signal, while the unsymmetrical Schmitt-trigger delivers the control signal.

According to another advantageous embodiment of the invention, the exciter magnet and the control magnet are identically magnetized. One of the pole pairs of the magnets is so unsymmetrically formed that the pole of one direction of magnetization is somewhat shorter than the pole of the other direction of magnetization, while a further pair or pairs of poles are symmetrical. Diametrically opposite to the detector of rotary position is another detector of rotary position. An one-sidedly operative exclusive OR-circuit is provided with two inputs, which are impacted by the output signals of both detectors of rotary position. The slight asymmetry of the one pair of poles virtually does not affect the functional characteristics of the motor. For example, the more positive of both output signals of the detectors of rotary position is used as a commutation signal, while the one-sidedly operative OR-circuit delivers a control pulse per each revolution of the rotor.

The invention will be now described on the basis of embodiments illustrated by the accompanying drawings, wherein:

FIG. 1 is a schematic cross-section of a collectorless direct current outer rotor motor of the invention.

Figure 4A:
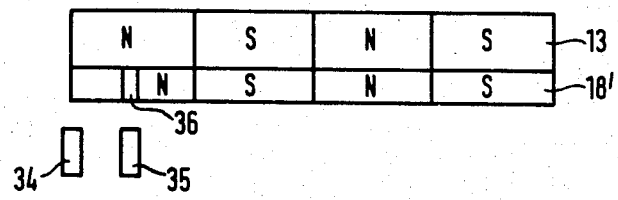
Figure 4B:
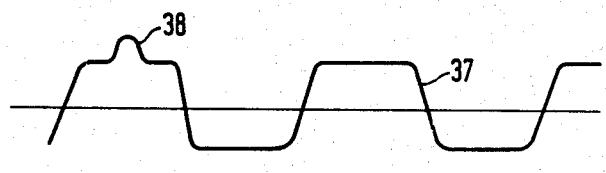
Figure 4C:
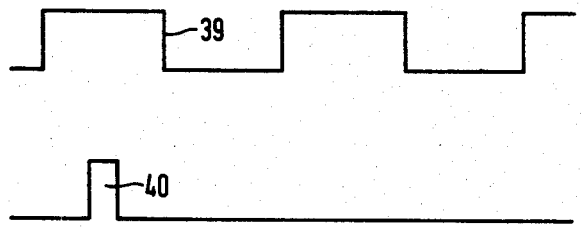
Figure 4D:

FIG. 4a shows the winding of the field magnet and control magnet for a modified embodiment of the motor, FIG. 4b is the field curve of the control magnet of FIG. 4a, FIGS. 4c and 4d show the commutation signal or the control signal of the modified embodiment of FIG. 4a, FIG. 5a is a winding of the field magnet and the control magnet for another modified embodiment of the invention, FIGS. 5b to 5e shows various signals for the motor according to FIG. 5a, and FIG. 6 is a diagram of the circuitry plan of the detectors of rotary position and the one-sidedly operative exclusive OR-circuit provided in conjunction with the embodiment of FIG. 5a.

Figure 7:
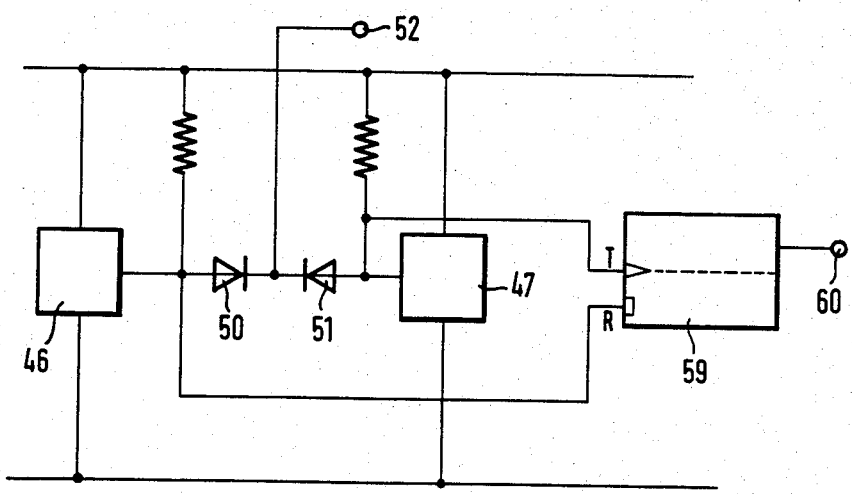

FIG. 7 is a diagram of the circuitry plan of the detectors of rotary position and of a computing circuit in the form of a dynamically triggered flip-flop, which are provided in conjunction with the embodiment of the magnets according to FIG. 5c.

FIG. 8a to FIG. 8g is a winding of the field and control magnet according to FIG. 5a and different signals for the embodiment according to FIG. 7.

Figure 9:
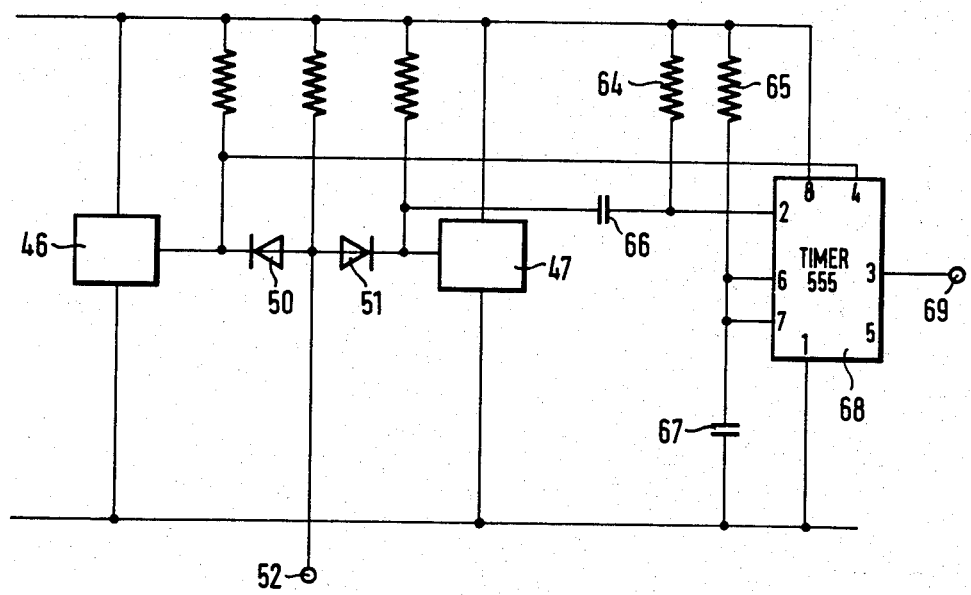

FIG. 9 is a diagram of the circuitry of the detectors of rotary position and of the computing circuit in the form of a monoflop with back-set input, provided in conjunction with the embodiment of the magnets according to FIG. 5a.

FIGS. 10a to 10d are a winding of the field and control magnet according to FIG. 5a and different signals for the embodiment according to FIG. 9.

Figure 2A:
FIGS. 2a and 2b show the field curves for the exciter magnet or the control magnet of the motor of FIG. 1.
Figure 2B:

The collectorless direct current outer rotor motor 10 shown in FIG. 1 comprises a stator package 11 of sheet iron, supporting a stator winding arrangement 12, which in this embodiment is a one-cable arrangement. The sheet iron stator package 11, together with an annular, permanently magnetized exciter magnet 13, forms a substantially cylindrical air gap 14. It is assumed in this embodiment that the exciter magnet 13 is radially four-polarly magnetized. This means that two magnetic north poles and two magnetic south poles are located in alternating sequence on the inner side of the exciter magnet 13 facing the air gap 14, in each case corresponding substantially to a width of 90° (physically). There is obtained in such a way an approximately rectangular or trapezoidal magnetization in the circumferential direction of the air gap 14, as shown by the exciter curve 15 in FIG. 2a. The exciter magnet 13 is disposed on an outer rotor bell 16 which forms the magnetic contact; e.g. it is glued into the bell. An annular, permanently magnetized control magnet 18 is disposed below the exciter magnet 13; said control magnet 18, according to the control field curve 19 of FIG. 2b has on the side facing the air gap 14 only one north pole of a width corresponding to the width of the north and south poles of the exciter magnet 13. Two detectors 20, 21, e.g. Hall generators or Hall-ICs cooperate with the control magnet 18; said detectors are diammetrically opposite relative to the axis of the rotor.

Particularly expedient as the exciter and control magnets are rubber magnets or plastic-bound magnets. Exciter and control magnets can be made of two separate magnet rings, but they can be also integral. Instead of magnet rings, also tray-shaped magnetic segments can be glued into the ball 16 or in some way incorporated there. A stub shaft 23 is mounted in the center of the outer rotor bell 16; said shaft is supported in a ball bearing 24 in a sleeve 25, which supports the sheet iron stator package 11 and is mounted on a stator base plate 26.

Figure 2C:
FIGS. 2c, 2d and 2e shows various signals occuring in the motor of FIG. 1.
Figure 2D:
Figure 2E:
Figure 3:
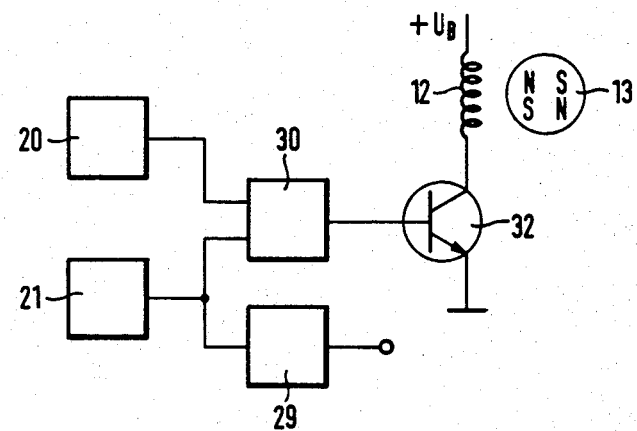
FIG. 3 is a simplified diagrammatic circuit plan of the motor of FIG. 1.

When the outer rotor bell 16 rotates relative to stationary detectors of the rotary position 20, 21, detector 20 emits a signal 27 (FIG. 2c), while detector 21 delivers a signal 28 (FIG. 2d) which is offset by 180° relative to signal 27. Each of the signals 27, 28 can be used as a control signal, which occurs only once per each revolution of the bell 16. If narrower control pulses are expected, it is sufficient to contact, for example, a monoflop 29, adapted to be triggered by positive flanks or edges, with the outlet of one of the detectors 20, 21, as shown in FIG. 3. Signals 27, 28 are then combined in an addition stage 30 to the commutation signal 31 of FIG. 2e, and the commutating means, diagrammatically shown in FIG. 3 as 32, is therewith impinged.

FIG. 4a diagrammatically shows a winding of the exciter magnet 13 and of control magnet 18' together with two detectors of rotary position 34, 35, adapted to switch in response to the magnetic field and spaced apart at any distance in circumferential direction. The exciter magnet 13 and the control magnet 18' in this embodiment have the same number of pairs of poles. But an auxiliary magnet 36, likewise diagrammatically shown in FIG. 4a, is associated with the control magnet 18' in the area of one pole. As a result, a control field curve 37 of the kind illustrated in FIG. 4b is formed under the influence of the auxiliary magnet 36; the curve has a discontinuity in the form of a hump 38. Detector 34 is equipped with a symmetrical Schmitt-trigger, i.e. a Schmitt-trigger responsive to signals of both polarities, insofar as these signals exceed a predetermined minimum level. This minimum level is so adjusted that it corresponds at most to the normal amplitude of the control field curve 37. But detector 35 has an asymmetrical Schmitt-trigger responsive only to signals according to the positive part of the control field curve 37. The threshold magnitude thereof is so adjusted that the trigger delivers a signal only when the auxiliary magnet 36 runs past on the detector 35. Under these conditions, at the output of the detector 34 appears the commutation signal 39 of FIG. 4c, while detector 35 emits the control signal 40 (FIG. 4d) in the form of a pulse, which occurs only once per each complete revolution of the outer rotor bell 16.

FIG. 5a shows a winding similar to FIG. 4a. The exciter magnet 13" and the control magnet 18" are identically magnetized. In this connection, the first pole pair in FIG. 5a is so unsymmetrically formed that the north pole 43 facing the air gap is somewhat shorter than the south pole 42. But the poles 44, 45 of the second pole pair are symmetrical. The control magnet 18" has again two therewith associated detectors of rotary position 46, 47, which are offset relative to each other by 180°, e.g. Hall-ICs. Pulse sequences 48, 49, according to FIG. 5b or 5c, appear at the outlets of detectors 46, 47 on rotation of the outer rotor bell 16.

As shown in FIG. 6, the outlets of the detectors of rotary position 46, 47 are each connected via a diode 50, 51 to the one compound point 52. This means that a signal 53 (FIG. 5d) appears at the compound point, and said signal corresponds to the one more positive of both signals 48, 49 and represents a symmetrical commutation signal. The base of a transistor 55 via a pre-resistance 56 is connected to the outlet of the detector 47, while the emitter of the transistor 55 is connected to the outlet of detector 46. The so connected transistor 55 functions as one-sided exclusive OR-circuit, which at the outlet 57 delivers a pulse 58 (FIG. 5e) only when signal 49 is more positive than signal 48. This condition is met only once during each complete revolution of the outer rotor bell 16 for a time period corresponding to the shortening of the pole 43. Instead, the intended control signal appears at the outlet 57.

FIG. 7 shows a plan of circuitry similar to that of FIG. 6, but with a dynamically triggered flip-flop 59 instead of the exclusive OR-circuit with transistor 55. The cycle input T of the flip-flop 59 is impinged by the output signal of the detector 47 of rotary position, while the back-set input R of the flip-flop 59 applies to the output signal of the detector 46 of rotary position.

This plan of the circuitry provides the advantage that mutually overlapping signal flanks or edges of both detectors 46, 47 of rotary position and also mutually offset in time output signals of the detectors of rotary position, when the detectors of rotary position 46 and 47 are not exactly diametrically opposite, for example due to unavoidable construction tolerances, do not lead to any error signals in the evaluation, for example to the occurrence of two pulses per revolution instead of the intended one pulse per revolution.

This kind of function is seen in FIGS. 8a to 8g, of which FIGS. 8a, 8b, 8c and 8d correspond to FIGS. 5a, 5b, 5c or 5e and reflect the situation where the detector 47 of rotary position is exactly diagonally opposite the detector 46 of rotary position. But FIGS. 8e and 8f show signals 48', 49' of the detectors 46 or 47 of rotary position on a deflection of the detectors 46, 47 of rotary position from the correct diametric position. As follows from FIG. 8g, also in such case only a single output pulse 58' is delivered at the output 60 of the flip-flop 59 per each revolution of the motor.

FIG. 9 shows another modified plan of circuitry similar to that of FIGS. 6 and 7. As the evaluation (computing) circuit, there is provided a time indicator 68 of the 555 type, which, in conjunction with resistances 64, 65 and capacitors 66, 67 constitutes a monoflop with back-set input. Resistance 64 and condenser 66 form a differentiation member for dynamically triggering the set input 2 of the time member 68 with the output signal of the detector 47 of the rotary position. The output signal of the detector 46 of rotary position applies to the back-set input 4 of the time member 68. The function of this embodiment is very equivalent to the flip-flop evaluation according to FIG. 7. Also in this case there is provided precaution against error signals when the detectors 46, 47 of rotary position are not exactly opposite each other. The difference consists in that the pulse width $t_H$ of the control signal 58 occurring at the output 69 of the time member 68 remains always constant under the influence of the RC-member formed by resistance 65 and capacitor 67. This is indicated in FIG. 10; FIGS. 10a, 10b, 10c and 10d corresponding to FIGS. 5a, 5b, 5c and 5e.

The above described embodiments related to a one-cable motor with two pairs of poles. But the described principle is also readily applicable to other numbers of cables and/or motors with two or more pairs of poles. It is also applicable to motors with cylindrical airgap and an inner rotor and to a motor with a plane airgap and disc-shaped rotor, where the soft-magnetic back-set part opposite in the airgap the permanent magnet of the rotor can be associated with the rotor or the stator.

What is claimed is:

1. A collectorless direct current outer rotor motor with a substantially cylindrical air gap, particularly for driving magnetic plate accumulators, comprising a rotor, said rotor supporting a permanently magnetized exciter magnet having at least two pairs of poles and a permanently magnetized control magnet, at least one detector of rotary position, said detector cooperating with the control magnet and being responsive to the magnetic field to sense the position of the rotor, commutating means responsive to the detector of the rotary position, and a stator winding means connected to the commutating means, characterized by a control pulse generator stage (21,29; 35,36; 47,55) adapted to generate one pulse only per each revolution of the rotor (16) and coordinated with the control magnet (18, 18', 18''), the exciter magnet (13) and the control magnet (18') comprising each the same number of pairs of poles with the same pole width, the field course (37) having a discontinuity (38) within the range of a pole of the control magnet (18'), and in addition to the detector of the rotary position (34), the provision of another detector of the rotary position (35) responsive only to field discontinuity.

2. The collectorless direct current outer rotor motor according to claim 1, characterized by the fact that the control magnet (18) is so radially asymmetrically magnetized in circumferential direction that it has only one pole in the said direction of magnetization, the pole width of said one pole of the control magnet coinciding with the pole width of the exciter magnet (13), and further characterized in that another detector of rotary position (21) is located diametrically opposite to the said detector of rotary position (20), and that a circuit stage (30) adapted to add up the output signals of both detectors of rotary position is connected in series with the commutating means (32).

3. The collectorless direct current outer rotor motor according to claim 1, characterized by an additional magnet (36) coordinated with the control magnet (18') to form the field discontinuity.

* * * * *